Aug. 7, 1962 M. BRETSCHER 3,048,838
PULSE RADAR SYSTEM WITH ZERO DISTANCE CALIBRATION
Filed Dec. 11, 1958

United States Patent Office 3,048,838
Patented Aug. 7, 1962

3,048,838
PULSE RADAR SYSTEM WITH ZERO
DISTANCE CALIBRATION
Max Bretscher, Zurich, Switzerland, assignor to Albiswerk Zurich A.G., Zurich, Switzerland, a corporation of Switzerland
Filed Dec. 11, 1958, Ser. No. 779,730
Claims priority, application Switzerland Jan. 9, 1958
7 Claims. (Cl. 343—17.7)

My invention relates to radar systems of the pulse-modulated type in which the pulse transmitter and the receiver are connected to a common antenna.

In such systems, a time basis for measuring the pulse travel time as indicative of the target distance is provided by means of a zero reference pulse which differs from the transmitter pulse and is derived either from the modulation pulse or from the high-frequency transmitter pulse. The reference pulse, supplied to the distance measuring device through at least part of the receiving channel, represents in effect an artificial echo coming from an imaginary target at the distance zero from the location of the antenna or at a given distance slightly different from zero. For calibrating a given time scale, the reference pulse can be shifted with the aid of an adjustable time delay member so as to coincide with the zero point of the time scale when tracking a target of known distance. However, such zero-distance calibration is practical and is made, as a rule, only when initially placing a new radar installation into operation; but the method is too cumbersome and usually not employed for subsequent calibration of an operating radar installation.

It is an object of my invention to provide the possibility to readily perform a zero-distance calibration during normal operation of a pulse-radar system and to prevent the normal performance and any concurrent zero calibration from detrimentally affecting each other.

To this end, and in accordance with one of the features of my invention, I provide for zero-distance calibration by using the transmitter pulse instead of the artificially produced zero echo as an indication of the distance zero. Coincidence of the transmitter-pulse reference with the zero point of the time scale can then be obtained by shifting the time scale, that is by adjusting the above-mentioned time delay member.

This principle, compared with the use of low-frequency calibrating signals usually taken from the modulator or the modulator exit, has the advantage that the reference pulse reaches the distance measuring instrument through the same channel as the genuine echo pulses so that the reference pulse is deformed and delayed to the same extent as the genuine echoes. Any changes in releasing delay of frequency-divider and trigger stages and any possible deformation of the low-frequency pulses, which may have a disturbing effect upon the above-mentioned known method and prevent recalibration without the use of a target of known distance, do not impair the accuracy of the distance measurement which, in a radar system according to the invention, remains merely dependent upon the accuracy and constancy of the time scale itself.

In pulse-modulated radar systems having the transmitter and receiver connected to a single directional antenna and having the receiver crystal unit protected by the spark gap of the so-called TR switch which bridges the receiver entrance in response to the transmitter pulses, limited use could be made of the above-mentioned principle underlying the invention, by using as the zero-reference pulse the fragment or "spike" of the transmitter pulse which reaches the receiver entrance immediately prior to the ignition of the protective spark gap. This pulse fragment, however, is not a definite measure of the time position of the transmitter pulses because the pulse center of the "spike," essential for measuring the travel time, is not accurately defined due to the variations in the time of the commencing ignition of the spark gap. Under such conditions, an accurate zero-distance calibration is infeasible.

In order to obviate the deficiency just mentioned, and in accordance with another feature of my invention, the reference pulses for zero-distance calibration are passed from the radar transmitter to the receiver through a shunt line that circumvents the spark gap (TR switch) and delivers part of the transmitter output energy to the receiver entrance. During calibrating operation the receiver entrance is shorted ahead of the connecting point of the shunt line in order to prevent the "spike" from being superimposed upon the transmitter pulse coupled into the receiver entrance, and to also prevent strong echo pulses of very short travel time from affecting the reference pulse. Such shorting of the receiver entrance can be effected, according to a more specific feature of my invention, by inserting into the wave guide between the protective spark gap and the receiver mixer space a closure or lid member as normally employed for protecting the mixer crystal of the receiver from signals coming from strong interfering transmitters. Since recently, TR spark-gap tubes are commercially available that are equipped with a short-circuiting device. These are suitable in some cases in lieu of the above-mentioned closure or lid member.

The invention will be more fully explained with reference to the embodiment shown by way of example on accompanying drawing in which.

Figure 1:
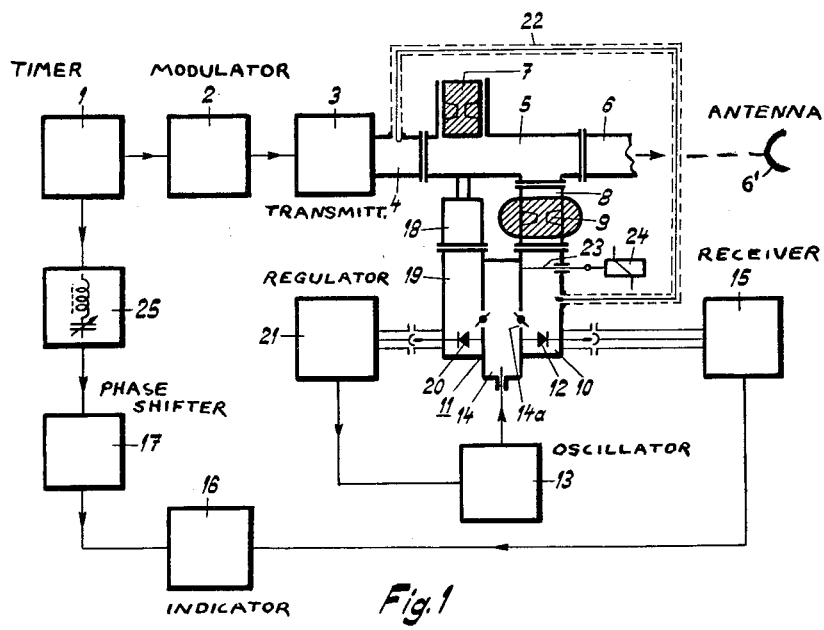
FIG. 1 illustrates a block diagram for the transmitting and receiving devices of a pulse-modulated radar system and also includes a more detailed, schematic illustration of the high-frequency mixer head duplexer and its connections embodying essential features required for the present invention.

In the diagram of FIG. 1, the timer of the radar system is denoted by 1. It comprises an oscillator, such as a quartz crystal oscillator, which furnishes the time scale for accurately measuring the travel time of the echo pulses and which, together with voltage divider stages of fixed phase, controls the periodic transmission of the high-frequency radar pulses. The timer pulses control the modulator 2, which generates the direct-current pulses of high power and short duration required for keying the transmitter stage 3. The transmitter stage 3 consists essentially of a micro-wave magnetron which translates the keying pulses into high-frequency pulses that are supplied through hollow wave guides 4, 5, 6 to the directional antenna 6' common to the transmitter and the receiver 15 of the system. Interposed in wave guide 5 is a spark gap 7 consisting of an ATR tube which, in response to the transmitter pulses, blocks the path to the transmitter stage 3 when echo pulses are being received. The echo pulses received pass from the antenna 6' through wave guide 6 and through an intermediate wave guide 8 to the entrance mixer chamber 10 of a high-frequency head (duplexer) 11 which contains the receiver mixer crystal 12. Another protective spark gap 9 formed by a TR tube is interposed in the wave guide 8. The mixer chamber 10 is supplied with oscillatory energy generated in a klystron oscillator 13 and delivered through a controllable opening 14a of a cavity resonator 14.

The intermediate-frequency pulses delivered from mixer chamber 10 to the receiver 15 are amplified and rectified in the receiver. The resulting low-frequency pulses pass from receiver 15 to the distance measuring device or indicator 16 comprising a radar scope, where they produce the desired distance indication in cooperation with the time-scale pulses supplied from timer 1 through a time-delay member 25 and a calibrated phase shifter 17. A portion of the transmitter energy passes from the wave guide 5 through a damping member 18 into the mixer chamber 19 which also contains a mixer crystal 20 for producing an intermediate-frequency oscillation used for the automatic follow-up frequency regulation of the oscillator 13. A regulator 21 serves for controlling the frequency of the oscillator 13.

For zero-distance calibration, a portion of the transmitter energy is taken from the transmitter channel at the exit of the transmitter stage 3 and is directly supplied to the receiver mixer chamber 10 by a line 22 that circumvents the TR-tube 9. According to FIG. 1, the shunt line 22 consists of a coaxial cable. The necessary attenuation is secured by suitable choice of the preferably adjustable coupling of line 22 to the wave guide 4 and to the receiver mixer chamber 10.

Figures 2, 3:
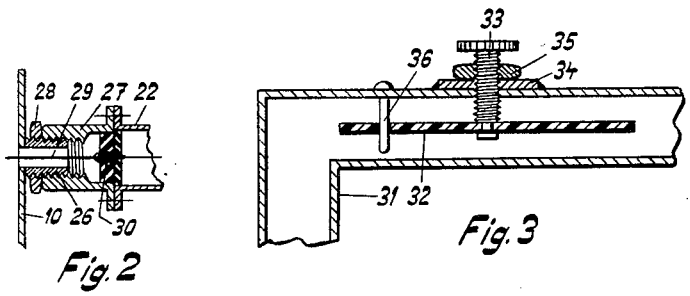
FIG. 2 is a longitudinal section through a terminal coupling of the zero-signal shunt line in a system according to FIG. 1.
FIG. 3 illustrates in section a portion of a modified shunt line also applicable in a system otherwise corresponding to FIG. 1.

An embodiment of a coupling of adjustable attenuation, applicable for the just-mentioned purpose, is illustrated in FIG. 2. The coupling serves to connect the coaxial cable 22 with the mixer chamber 10. It comprises a threaded nipple 26 firmly mounted on the wall of mixer chamber 10, a tubular piece 27 in threaded engagement with nipple 26 and firmly secured thereto in proper position by means of a counter nut 28. A centrally located electrode pin 29 determines the degree of coupling between cable 22 and chamber 10 in dependence upon the entering depth of pin 29 into the mixer chamber. A socket 30 mounted on member 27 and insulated therefrom is conductively connected with pin 29 and forms, together with the central conductor of the coaxial cable 22, a plug-in connector. A similar plug connection may be provided between the coaxial cable 22 and the wave guide 4. It will be understood that any other devices for providing a coupling of suitable or adjustable attenuation may be used instead of the one exemplified by FIG. 2.

The reference pulses passing in the above-described manner from the transmitter stage 3 to the mixer chamber 10 of the receiver in shunting relation to the TR-tube 9 are accurately in accordance with the transmitter pulses as regards shape and duration, and any deformation and delay occurring in the subsequent stages up to the distance indicator 16 act upon the reference pulses to the same degree as upon the echo pulses. A prerequisite for the desired coincidence in shape and duration of the pulses is that the transmitting and receiving devices during zero-distance calibration are in the same operating condition as during distance measuring. Furthermore, as already mentioned, it must be prevented that during calibrating operation any pulse fragments can pass to the receiver entrance through the protective spark gap or TR-tube 9. Such disturbance is prevented by means of a closure member 23 which is actuated by an electromagnet 24 and can thus be shoved into the receiver mixing chamber 10 directly behind the spark gap 9.

The displacement of the time scale for calibrating the zero-distance point is preferably effected by phase shifting in the distance measuring circuit. Used as a time delay member is preferably a series-type resonance member of variable tuning capacitance inserted between the timer 1 and the phase-shifter 17, such a time delay member being indicated at 25 in FIG. 1.

Instead of the above-described coaxial cable, the shunt connection for circumventing the TR-switch between transmitter and mixer chamber 10 may consist of a hollow wave guide comprising a controllable damping member for adjusting the desired attenuation. Part of such a wave guide is shown in FIG. 3 and denoted by 31. Located within the wave guide is a damper plate 32 of absorption material which is mounted on a bolt 33 passing through the wall of guide 31 and provided with a knurled head. The bolt 33 is in threaded engagement with a nut 34 secured to the wave guide structure and is secured in an adjusted position by means of a lock nut 35. The damper plate 32, extending transversely through the interior of the guide structure, can be displaced by means of the bolt 33 and is guided by means of a stationary guide pin 36 secured to the structure 31 and passing through an opening of the plate 32.

It will be understood by those skilled in the art that the above-described components, illustrated in FIG. 1 in block fashion (1, 2, 3, 13, 15, 16, 17, 21, 25) are known as such and that their particular details are not essential to the present invention. It will further be understood that the invention, with respect to the novel devices embodied in the radar system for the purpose of zero-reference calibration may be modified in various respects and hence may be embodied in equipment other than illustrated and described herein, without departing from the essential features of my invention and within the scope of the claims annexed hereto.

I claim:

1. A pulse radar system, comprising a radar antenna, a pulse transmitter having an exit connected with said antenna, a receiver having an entrance connected to said antenna at a location between said transmitter exit and said antenna, a TR-switch having a spark gap bridging said receiver entrance in response to pulses passing from said transmitter exit to said antenna, and zero-distance calibrating means for instantaneously passing a portion of the transmitter energy to said receiver to serve as a zero-distance reference signal, said means including a pulse transmitting line extending between said transmitter exit and said receiver in circumventing relation to said spark gap.

2. A pulse radar system, comprising a radar antenna, a pulse transmitter having an exit connected with said antenna, a receiver having an entrance connected to said antenna at a location between said transmitter exit and said antenna, a TR-switch having a spark gap bridging said receiver entrance in response to pulses passing from said transmitter exit to said antenna, a timer connected with said transmitter, a distance indicator having a time reference circuit connected with said timer and having a signal circuit connected with said reviewer, an adjustable time delay line interposed between said timer and said indicator to provide a displaceable time scale, and means for instantaneously passing a portion of the transmitter energy to said receiver to serve as a zero-distance reference signal for calibrating said time scale, said means including a pulse transmitting line extending between said transmitter exit and said receiver in circumventing relation to said spark gap.

3. A pulse radar system, comprising a radar antenna, a pulse transmitter, a wave guide connecting said transmitter with said antenna, a receiver, a duplexer having a mixer including a resonator cavity connecting said receiver with said wave guide and containing a mixer crystal unit, a TR-switch interposed between said cavity and said wave guide, a timer connected with said transmitter, a distance indicator having a time reference circuit connected with said timer and having a signal circuit connected with said receiver, an adjustable time delay line interposed between said timer and said indicator to provide a displaceable time scale, means for instantaneously passing a portion of the transmitter energy to said receiver to serve as a zero-distance reference signal for calibrating said time scale, said means including a pulse transmitting line extending directly between said transmitter and said resonator cavity in shunt relation to said TR-switch, and means for selectively shorting the connection to said resonator cavity from said TR-switch.

4. In a radar system according to claim 3, said pulse transmitting line consisting of a hollow wave guide communicating with said former wave guide and with said mixer chamber.

5. In a radar system according to claim 3, said pulse transmitting line consisting of a hollow wave guide and comprising in said latter wave guide an adjustable damping member for controlling the attenuation of said latter wave guide.

6. A pulse radar system, comprising a radar antenna, a pulse transmitter having an exit connected with said antenna, a receiver having an entrance connected to said antenna at a location between said transmitter exit and said antenna, a TR-switch having a spark gap bridging said receiver entrance in response to pulses passing from said transmitter exit to said antenna, means for selectively shorting the receiver entrance, whereby energy will not pass from said transmitter to said receiver, and zero-distance calibrating means for instantaneously passing a portion of the transmitter energy to said receiver to serve as a zero-distance reference signal, said means including a coaxial cable extending between said transmitter exit and said receiver in shunt relation to said spark gap.

7. A radar system according to claim 6, comprising coupling means of adjustable coupling degree connecting said coaxial cable with at least one of said transmitter and receiver.

References Cited in the file of this patent

UNITED STATES PATENTS

| | | |
|---|---|---|
| 2,788,520 | Arenberg et al. | Apr. 9, 1957 |
| 2,850,727 | Schooley | Sept. 2, 1958 |
| 2,883,659 | Bowie | Apr. 21, 1959 |
| 2,883,660 | Arenberg | Apr. 21, 1959 |
| 2,938,203 | Odden | May 24, 1960 |